US012155708B1

(12) United States Patent
Hinds et al.

(10) Patent No.: US 12,155,708 B1
(45) Date of Patent: *Nov. 26, 2024

(54) MEDIA AND APPLICATION AWARE NETWORK ARCHITECTURE

(71) Applicant: CABLE TELEVISION LABORATORIES, INC., Louisville, CO (US)

(72) Inventors: Arianne T. Hinds, Louisville, CO (US); Darshak Thakore, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,581

(22) Filed: Jan. 25, 2022

Related U.S. Application Data

(62) Division of application No. 16/914,048, filed on Jun. 26, 2020, now Pat. No. 11,418,560.

(60) Provisional application No. 62/867,302, filed on Jun. 27, 2019.

(51) Int. Cl.
*H04L 65/612* (2022.01)
*H04L 65/80* (2022.01)
*H04L 67/02* (2022.01)
*H04L 67/568* (2022.01)

(52) U.S. Cl.
CPC ............ *H04L 65/612* (2022.05); *H04L 65/80* (2013.01); *H04L 67/02* (2013.01); *H04L 67/568* (2022.05)

(58) Field of Classification Search
None
See application file for complete search history.

(56) References Cited

U.S. PATENT DOCUMENTS

| 2003/0158913 | A1 | 8/2003 | Agnoli et al. |
| 2011/0137973 | A1* | 6/2011 | Wei ..................... H04L 67/1001 709/202 |
| 2014/0280677 | A1* | 9/2014 | Altman .................. H04L 67/06 709/213 |
| 2014/0344391 | A1 | 11/2014 | Varney et al. |
| 2015/0067722 | A1 | 3/2015 | Bjordammen et al. |
| 2015/0207699 | A1 | 7/2015 | Fargano et al. |
| 2016/0134881 | A1* | 5/2016 | Wang .................. G06F 9/45558 375/240.02 |

(Continued)

FOREIGN PATENT DOCUMENTS

WO 2018172614 A1 9/2018

*Primary Examiner* — Scott B Christensen
(74) *Attorney, Agent, or Firm* — PdZ Patent Law, PLLC (57) ABSTRACT

Systems and methods of operation are disclosed for media delivery systems operable to deliver requested media content to a client device by accessing media resources and media processing elements available on a network to which the media delivery system and client devices are linked. The media delivery system is operable to use the media resources and media processing elements to provide the requested media content in a requested format. The media delivery system may implement network-based media processing, and may use Immersive Technologies Media Format. The media delivery system may implement, such as in, or between, the application layer and network layer according to the OSI model, two control planes: a media control plane and a network control plane, and a data plane: a media data plane.

19 Claims, 7 Drawing Sheets

(56) References Cited

U.S. PATENT DOCUMENTS

2016/0323351 A1 11/2016 Luthra et al.
2018/0139254 A1* 5/2018 Oyman ............ H04N 21/23439

* cited by examiner

MEDIA AND APPLICATION AWARE NETWORK ARCHITECTURE

CROSS-REFERENCE TO RELATED APPLICATION

This application is a divisional application of U.S. patent application Ser. No. 16/914,048, filed Jun. 26, 2020, which application is a nonprovisional of, and claims the benefit under 35 U.S.C. § 119(e) of, U.S. Provisional Patent Application No. 62/867,302, filed on Jun. 27, 2019. Each of the aforementioned patent applications is incorporated herein by reference.

TECHNICAL FIELD

The described embodiments generally relate to architectures, structures, and components for media delivery systems and networks that provide video, audio, or other media content to client devices of end users, and methods of operations of such structures and components of such media delivery systems. Particular embodiments are directed systems, structures, and architectures for delivery of media content for immersive and interactive video client devices.

BACKGROUND

Media delivery services or companies use media delivery systems and networks to obtain video, audio, web pages, or other media (herein, "media content") from a variety of sources, such as television companies, radio stations, sports venues, internet web sources, online gaming companies, among others. The media content may be in any of multiple forms, recorded in multiple formats, such as 2-dimensional (2D) video, stereo video, immersive video, audio (either stand-alone or associated with video content), computer-generated images or video sequences, among others. The media delivery system may store some or all of such media content, and provide it to client devices, e.g., devices or systems used by customers or other end-users to view, hear, or otherwise experience the media content. Alternatively, the media delivery system may directly process or encode live produced media content and provide it to client devices without storing the media content.

SUMMARY

Embodiments described herein may relate to, include, or take the form of: media delivery systems and methods of their operation, computer networks and their methods of operation, and to architectures or structural components, and their operations, of media delivery systems.

Some embodiments described herein relate to and describe media delivery systems that may deliver media content to a client device. Such media delivery systems may include a media origin server, a network platform orchestrator, and local media resource server. The network platform orchestrator and the local media resource server may be communicatively linked with the media origin server. The media origin server may implement a media control plane configured to respond to a request for media content from the client device, and provide the media content to the client device, the media content being adapted from a media resource. The media control plane may be operable to implement a network control plane by which the media delivery system can access a network resource element for adapting the media resource, and operable to implement a media data plane to perform processing for adapting the media resource. In some embodiments, the media control plane may perform such implementation by instantiating or accessing a program or communication link of the media delivery system.

In some embodiments, the media control plane, the network control plane, and the media data plane may be implemented by respective application programming interface programs. The media origin server may be operable to access a mezzanine file storing an Immersive Technologies Media Format package, which may include functions or programs for interchange or conversions of media formats, e.g., it may include at least one media translator function operable to translate a first format of the media resource to a second format of the media content. The Immersive Technologies Media Format package may include a performance indicator.

In some embodiments, the network platform orchestrator of the media delivery system is operable to establish a network session with a network communicatively linked with the media delivery system. The media delivery system may be operable to access and use the network resource element during the network session. The network resource element may be, or include, a compute media processing element or a storage media processing element of the client device. As defined further below, a compute media processing element may be any of a variety of processing elements, whether implemented in hardware, firmware, or software, that perform data processing. A storage media processing element may be or include any of a variety of memory technologies.

Some embodiments relate to and describe methods of operating a media delivery system that includes a media origin server, a network platform orchestrator communicatively linked with the media origin server, and a local media resource server communicatively linked with the media origin server. The methods may include the operations of receiving, at the media origin server, a request from a client device to receive media content from the media delivery system; implementing, by the media origin server, a media control plane, a network control plane, and a media data plane using respective application programming interface programs; establishing, by use of the network control plane, a network session connecting the media delivery system, the client device, and a network communicatively linked with the media delivery system; locating, by the network platform orchestrator, a media resource available during the network session; accessing, by use of the network control plane during the network session, a network resource element; providing the client device with access to the media resource by use of the media data plane; and adapting, by the network resource element, the media resource for inclusion in the requested media content.

In some embodiments of the methods, adapting the media resource for inclusion in the requested media content may include translating a first media format of the media resource to an Immersive Technologies Media Format; and translating the Immersive Technologies Media Format to a second format of the requested media content. In some embodiments, the network session uses a Management and Network Orchestration protocol.

In some embodiments, the method may also include determining that the client device is an unconstrained client device that includes a compute media processing element; transmitting native media from the local media resource server to the compute media processing element; and using the compute media processing element to adapt the native media for inclusion in the requested media content.

In some embodiments, the method may also include transmitting, from the media origin server to the network platform orchestrator, information regarding a quality of service requirement contained in the received request from the client device to receive media content. The method may also include determining, by the network platform orchestrator, that the network resource element is operable to meet the quality of service requirement.

Some embodiments are directed toward and describe media delivery systems that may include a media origin server and a network platform orchestrator operably connected with the media origin server. In some embodiments, the media delivery system may be configured to implement a media access plane to provide a communication link with a client device over a network, and to provide media content to the client device using the media access plane. In some embodiments, the media origin server includes a manifest file that contains information obtained from the request for media content from the client device, and includes a mezzanine file that contains a component of the requested media content in a first format. The network platform orchestrator may be operable to access a media processing element available on the network to adapt the component of the requested media content to a second format specified in the request for media content.

In some embodiments, the network platform orchestrator may include an optimization engine operable to determine, based on the request for media content, a requirement set for the media processing element. The requirement set may include at least one of a latency requirement; a bandwidth requirement; a power requirement; or a route cost. In some embodiments, the network platform orchestrator may include an application aware network controller that may include a software defined network controller; and a network function virtualization orchestrator.

BRIEF DESCRIPTION OF THE DRAWINGS

Reference will now be made to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate understanding of the various embodiments described herein and may not necessarily be presented or illustrated to scale, and are not intended to indicate any preference or requirement for an illustrated embodiment to the exclusion of embodiments described with reference thereto.

DETAILED DESCRIPTION

In view of the foregoing, embodiments described herein, broadly speaking, relate to networks, computer systems and devices, and other components that may form a media delivery system. The embodiments also relate to methods of operation of such media delivery systems, and to programs or instructions to cause such methods of operation of such media delivery systems.

As used herein, a media delivery system may refer to a collection of computer components, such as servers, processors (e.g., CPUs, GPUs, FPGAs) storage and memory systems and components, network interface components, communication technologies, and possibly other components, organized and/or interconnected to be able to store, process, and transmit or deliver media content to a client device. As used herein, a client device (or just "client") may refer to a device separate from the media delivery system that is operable to form a communication link, whether permanent or temporary, with the media delivery system. As used herein, media content may refer to video sequences, audio sequences, still images, immersive or 3D video images (such as may be used in a user headset), holographic displays, light field displays, augmented reality or virtual reality or the like, or to data or programs that produce them, or to signals containing such data or programs. As an example, an internet service provider (ISP) may operate a large collection of servers and other computers, which need not necessarily be collocated, that store and transmit programs or other media content to a set top box (STB) located at an end-user's home, for display on a TV screen.

As used hereinafter, for simplicity, a "server" may refer to a collection of one or more computers, data processing equipment, storage and memory systems, and similar components that are operably or communicatively linked. A server may operate as a computational resource or as a storage (memory) resource, or a combination thereof. A server may include memory components that may be permanent (e.g., magnet disk memory, non-volatile solid state memory), transitory (e.g., dynamic RAM), or a combination thereof.

Generally and broadly, media content may be transmitted by a media delivery system to a client device using any of a variety of network distribution channels. Examples of such network distribution channels include, but are not limited to, physical connection transmission technologies such as coax cable, fiber optic links, twisted pair wires, or other physical connection technologies, and may use internet protocol (IP), Ethernet protocol or another protocol. Further examples of network distribution channels include wireless communication channels, such as 5G (NR), LTE, or WiFi, among others known to those skilled in the art. A network distribution channel may include a combination of physical connection transmission technologies and wireless communication channels. A network distribution channel may include computers, computing resources, servers, routers, modems or other equipment or devices to perform the transmission of the media content to the client device.

Some media delivery systems may be structured to initiate delivery or transmission of the media content to a client device upon receiving a request or signal from the client device. Thereupon the media delivery system network retrieves the media content from storage, or generates it from segments thereof, and transmits the media content to the client device over the network distribution channel. As a first example, an end-user whose client device is a large screen TV may request video and/or audio of a sporting event, either live or recorded. The media delivery network obtains or retrieves such video and/or audio, either as it is received live from the cameras at the sporting event, or from a storage media or memory. The media delivery system may apply any appropriate formatting, compression, or other signal processing, for transmission to the client device over the network distribution channel. The end-user may have some capabilities to alter the received media content or its display on a viewing device, such as fast-forward, slo-mo, or rewind. As a second example, an end-user's client device may be a WiFi router connected to a cable modem of a cable internet provider, where the router may be capable of distributing internet content to multiple computers, smartphones, or other devices within the end-user's home network. Each device transmits signals to the media delivery network through the router. The media delivery system obtains the requested internet content from original sources, such as news organizations or online retailers, and transmits the internet content to the device.

The basic paradigm for media delivery systems just described can be sufficient for many situations, in particular for the delivery of recorded video media to client devices that support two-dimensional displays, such as raster-based displays. However, new and emerging media technologies may not be as easily supported. Examples of such emerging technologies include virtual reality displays or headsets, augmented reality displays or headsets, three-dimensional immersive displays, and the like. The basic paradigm of a media delivery system just described may have certain difficulties or limitations for implementing these emerging technologies. For example, the technologies often require real-time interactions between the media delivery system and the client devices of the new technologies. Further, the media delivery system may require access to multiple, separately stored (e.g., in internet cloud storage) resources to generate the media content for the client devices. Also, the media delivery system may have to process or adapt the stored resources for the particular client device, and to do so may access, "on the fly," additional computing resources, such as from cloud-based computing services.

Some embodiments herein describe methods of operation of media delivery systems, (whether implemented in hardware, firmware, or software) that cause the media delivery systems to perform tasks related to transmitting or delivering media content to one or more client devices. In the example of the ISP, such operations may include locating and recalling data for a requested TV program, and changing or processing the video data thereof to have a format suitable for the STB (the client device).

In some embodiments, an operation that may be performed by a media delivery system is establishing a communication link or connection with a computer network, or just "network," that is separate from the media delivery system. As used herein, a network may mean one or more communicatively linked computers, servers, and the like. Examples include the internet, a LAN, a WAN, and the like. The communication link may be over a physical transmission media (e.g., cable, twisted pair, fiber optic, and so forth), a wireless link (e.g., broadcast or cellular, including but not limited to 5G NR, LTE, CDMA, WCDMA, and so forth), or any combination thereof. In the ISP example, the ISP may establish a link over the internet to a cloud computing service or a separate web service provider, or to web hosting company.

Some embodiments described herein, broadly speaking, are directed to implementing network-based media processing (NBMP). In NBMP, various computing, processing, storing, and transmitting operations are coordinated by the media delivery system, by locating and accessing computational, processing, and storage, capabilities or resources present either of the media delivery system itself, or of such capabilities or resources present on a separate network, or on the client device itself.

More particularly, some embodiments herein disclose media delivery systems that are directed to, or structured for, providing media content to client devices having advanced technologies, such as (but not limited to) virtual reality displays or headsets, augmented reality displays or headsets, three-dimensional immersive displays, and the like. Such advanced technologies may require any of: specialized formats for the media content, a high degree of interactivity between the client device and the media delivery system, access to source media stored in multiple sites on a network, or other requirements for the client device to provide the media content with an expected quality of service to an end-user.

In the example of the ISP, the client device may be an end-user's VR headset that requests a virtual tour of a museum. There may be a large amount of native media data (e.g., captured video sequences) stored across multiple locations in multiple formats. The ISP may have reason to acquire and/or select the appropriate components or sections of the native media data, which could change or depend on the end-user's virtual movement through the museum, and process them (e.g., to account for the end-user's viewing direction), and convert the appropriate components or sections of the native media data to a format or instruction set for the end-user's particular brand of VR headset.

Broadly and generally, as described in further detail below, some embodiments disclose media delivery systems that include at least a media origin server, a network platform orchestrator, and a local media resource server. As described in more detail below, the media origin server hosts the media resources to meet a request for media content from a client device. These media resources may be computational or storage resources. The network platform orchestrator may be a physical or logical device that interacts with the media origin server to determine requirements to meet the client device's request for media content, and provisions (such as obtaining access to) resources in a network to which the media delivery system may be communicatively linked. The local media resource server may be a server collocated with the media origin server in the media delivery system.

Broadly and generally, as described in further detail below, some embodiments disclose media delivery systems that make u for adapting or translating acquired media resources to various formats required by multiple client devices, running a variety of applications (e.g., gaming, VR/AR displays) making various requests to the media delivery system for media content.

Broadly and generally, as described in further detail below, in some embodiments a media delivery system may implement NBMP may implementing a media control plane, a network control plane, and media data plane. These programs may provide, among other operations, communication between components of the media delivery system, the client device, and a network to which the media delivery system has established communication. In some embodiments, the implementation of the media control plane, network control plane, and media data plane may be implemented as application programming interfaces (API), and may be organized or implemented as protocols or programs in or between the application layer and the network layer, as per the Open Systems Interconnection (OSI) model for communication systems, though this is not required.

These and other embodiments are discussed in more detail below with reference to FIGS. 1A-6 below. However, those skilled in the art will readily appreciate that the detailed description given herein with respect to these figures is for explanatory purposes only and should not be construed as limiting.

Figure 1A:
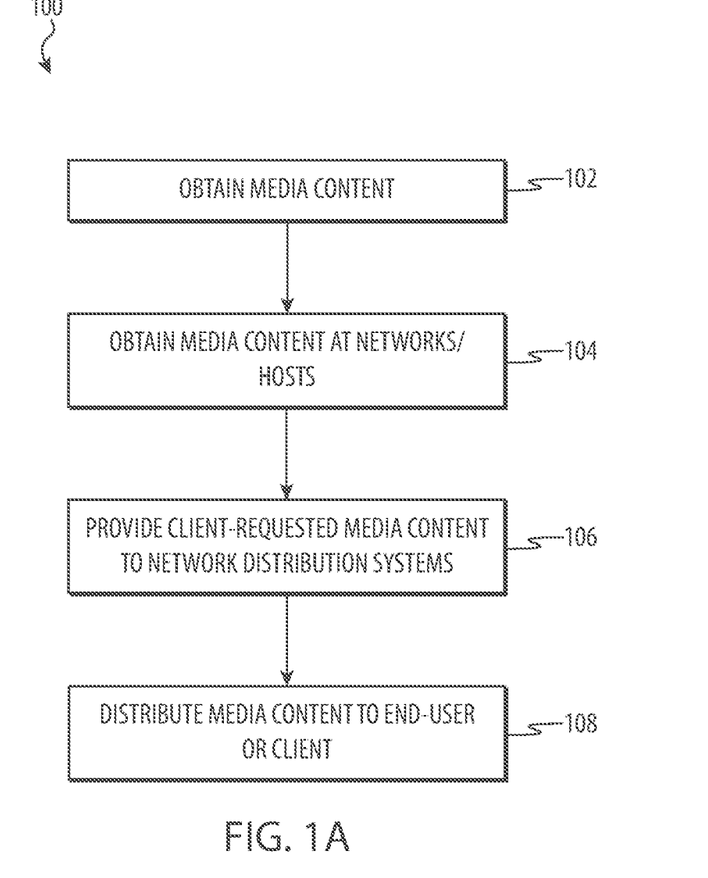
FIG. 1A is a flow chart of a method of providing media content over a media delivery system to an end-user or client device, as described herein.
Figure 1B:
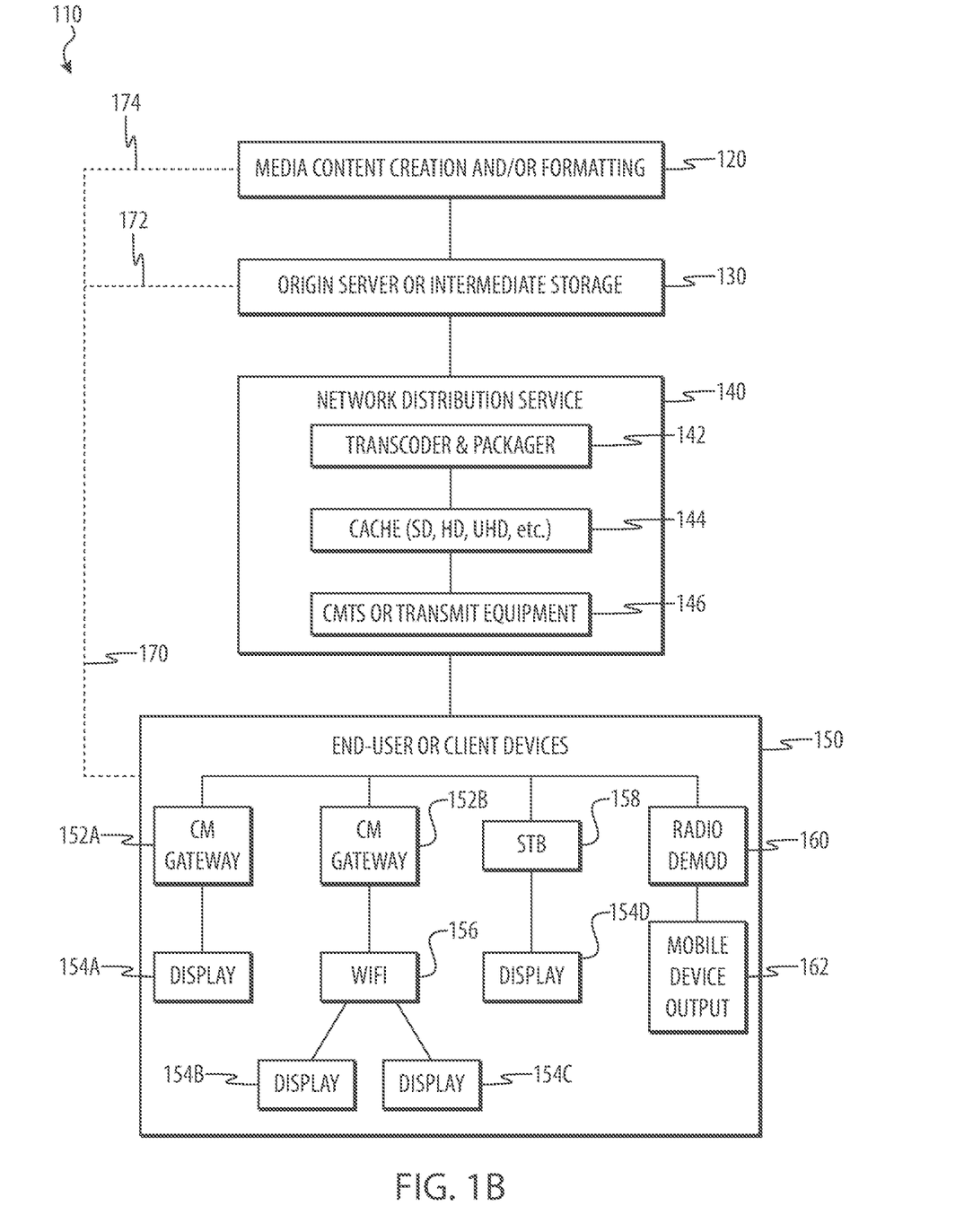
FIG. 1B depicts a block diagram of certain components of a system for a media delivery system configured to provide media content to a client device, as described herein.

FIGS. 1A and 1B, generally and broadly, are directed to structures and methods of operation of media delivery systems with, or directed toward, IP-based network architectures.

FIG. 1A is a flow chart of a method of providing media content over a media delivery system to an end-user or client device. The method may be initiated by the media delivery system in response to receiving a request at the media delivery system from a client device for the media (video, audio, gaming graphics images, or another media).

At operation 102, original source media content may be obtained by the media delivery system from an original producer of the media, such as video of a sporting event recorded by cameras of a television station. The original media content may have been previously obtained and stored in one or more formats by the media delivery system.

At operation 104, the media delivery system may also obtain additional source media content stored on networks, such as web storage or hosting networks, or networks maintained by the media delivery system itself. In the example of a sporting event, the media delivery system may obtain video and audio source media for commercial advertisements from a network maintained of sponsors of the event.

At operation 106, the media delivery system combines and processes, as necessary, the source media content. The result may then be provided to a network distribution system of the media delivery system. The network distribution system may include and operate storage and transmission equipment that sends the requested media content to the client device.

At operation 108, the media content is transmitted or distributed to the end-user's client device(s), examples of which may be a person's own home network or an electronic device operable to output the media content (such as television screens, audio speakers, displays of smartphones or laptop computers, and the like).

It may be appreciated, however, that the foregoing examples are not exhaustive and that other operations may be included.

FIG. 1B is a block diagram representation of a media delivery system 110 which may implement the method 100. The media delivery system 110 includes a media creation and/or formatting subsystem (MCFS) 120. The MCFS 120 may include communication devices and storage capabilities to obtain media content, such as described for the operations 102 and 104 of the method 100 above. The obtained media content may then be provided to the storage subsystem 130, which may store the obtained media content in an origin server or other intermediate storage to be available for later transmission.

In response to a request from a client device for the obtained media content, the media content may be provided to the network distribution systems 140. The network distribution systems 140 may include a transcoder and packager 142 that may convert the media content to an appropriate electronic format (e.g., MPEG, with or without compression) with any appropriate signaling header data. The transcoder and packager 142 may also convert the media content to various service quality levels, such as standard definition (SD), high definition (HD), or ultra-high definition (UHD). This converted form of the media content may then be stored in a cache memory 144. This converted form of the media content may then be provided to transmission equipment 146 (which may include a cable modem termination (or transmission) system (CMTS) in the case that the media delivery system is a cable network provider), that transmits the converted and packaged form of the media content to the end-user over the transmission channel (cable, fiber optic, cellular radio, or another transmission channel).

The transmitted media content is then received by one or more client device(s) 150. For explanatory purposes, multiple examples of client devices 150 are shown, though a single end-user (or customer) may have only one of such client devices 150, but in other examples a single end-user may have multiple client devices 150. In one example, a cable modem (CM) and gateway 152A is directly linked with a display device (e.g., a television screen) 154A. In a second example client device, a CM and gateway 152B is linked with a wireless router 156 to transmit received internet content to display devices 154B and 154C. In a third example, a set top box (STB) 158 is directly linked with display device 154D. In a fourth example, a cellular radio signal receiver 160 in a mobile device demodulates the received cellular radio transmission, and the original media content is then output onto the mobile device 162.

In some cases, the structure or architecture of the media delivery system 110 allows for some interactive adjustment of the media content. In one example the media delivery system allows upstream signaling 172 from the end-user to pause or show video in slow motion. In another example, upstream signal 174 may allow an end-user to make a new request for media content.

The IP-based directed network architectures, such as those of FIGS. 1A and 1B, may not provide sufficiently robust capabilities to support the requirements of various immersive technologies, such as virtual or augmented reality, realistic multi-player real-time gaming, or other interactive or computationally intensive media technologies.

Generally and broadly, FIGS. 2-6 describe certain embodiments of media delivery systems that make use of network virtualization, software defined network technologies, and other systems and methods to deliver media content to client devices. The embodiments directed to the delivery of a variety of media content for a heterogeneous client environment. For example, a media delivery service using such embodiments may be able to provide different levels of media experiences, such as immersive media experiences (e.g., AR or VR), 3D video and audio to 3D video enabled televisions (such as liquid crystal or plasma screens) or headsets, interactive gaming video and audio, 360 degree video and audio, and other media content.

The embodiments to be discussed in relation FIGS. 2-6 may be used by media delivery services to provide varying levels of service to end-users. The embodiments may allow the media delivery services to make use of network distributed computing or processing capabilities, network or cloud storage, or interaction with other networked services (such as web hosting or computing) such as may be provided by other services or companies.

More particularly, some of the embodiments to be discussed in relation FIGS. 2-6 described below may provide capabilities to support a variety of immersive video and audio technologies. Examples of such technologies include, but are not limited to: (1) next generation head mounted displays that support foveated rendering for 360-degree video, such as supporting tiles (e.g., rectangular sub-portions of video frames) provided at varying resolutions. For example, the exact center of the frame (where the eyes focus) for 360-degree video is isolated into a single tile provided at a higher resolution, while the immediate areas surrounding the exact center portion may be provided at a lower resolution, (2) AR displays such as ODG glasses, (3) mixed reality displays (e.g., Magic Leap One), (4) Volumetric displays (e.g., LookingGlass displays), (5) Coarse resolution light-field display (e.g., Fovi3D displays), and (6) high resolution light-field display (e.g., Light Field Lab displays). Each of the above displays support one or more media formats at potentially different resolutions, with different degrees of freedom and interactivity requirements. Each of the above displays may be used for different applications, such as games, interactive telepresence, changes in points-of-view (e.g., 360-degree viewing), and passive viewing of long-form content (e.g., streaming movies).

As a first, but non-limiting, illustration of how a media delivery service may use embodiments described herein, consider the case mentioned above of an end-user wishing to use a VR headset providing full field of view. The museum's halls and galleries may have been previously imaged in 3D and depth detail, with the image data stored in a particular, native format. As the end-user virtually walks through the museum and changes viewpoint, the media delivery service may have reason to acquire the image data appropriate for the viewpoint and virtual position of the user, and process that data to provide the correct 3D view and to transmit media content adapted for the VR headset (the client device in this case) of the end-user. The original stored image data may have been stored on various servers, possibly at multiple locations connected by a network. The media delivery service may have reason to have access to the multiple locations, and may have reason, depending on the resolution (quality of service) expected by the end-user, to access to differing levels of processing capabilities.

As a second, but non-limiting, illustration of how a media delivery service may use various embodiments described herein, consider the case of a sporting event being imaged by multiple video cameras from multiple angles throughout the arena. The cameras may be capturing the event using different technologies or formats. An end-user using a high resolution TV screen may wish to view the event from interactively variable viewing angles (zoom-in, zoom-out, rotate, and so forth). The media delivery service may be able to meet such requests by applying processing to the cameras' image data to combine the image data, such as by creating a 3D model of the event in real-time, and creating video therefrom for the end-user's viewing angle.

These two illustrative cases, as well as other cases, show that it can be advantageous for media delivery systems to use or leverage one or more of: distributed network computing, distributed media storage, software defined network technology, translation processing functionality to convert between multiple data formats, as well as other technologies, to provide end-user interactivity and differing levels of service, and to provide greater data processing and storage demands, as well as provide other features or capabilities.

Figure 2:
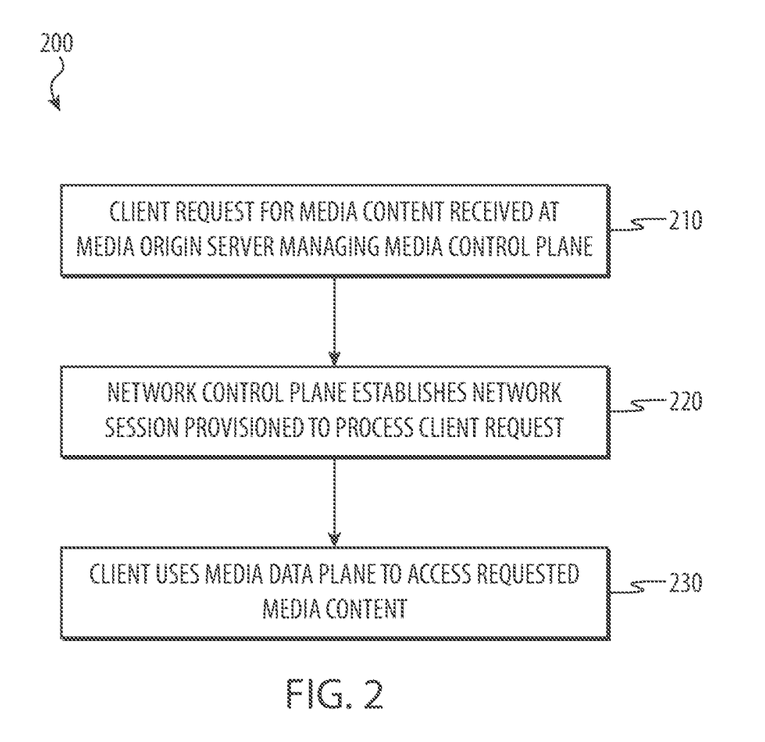
FIG. 2 is a flow chart of a method for providing media content over a media delivery system that can adapt to requests from client devices, according to embodiments such as described herein.
Figure 3:
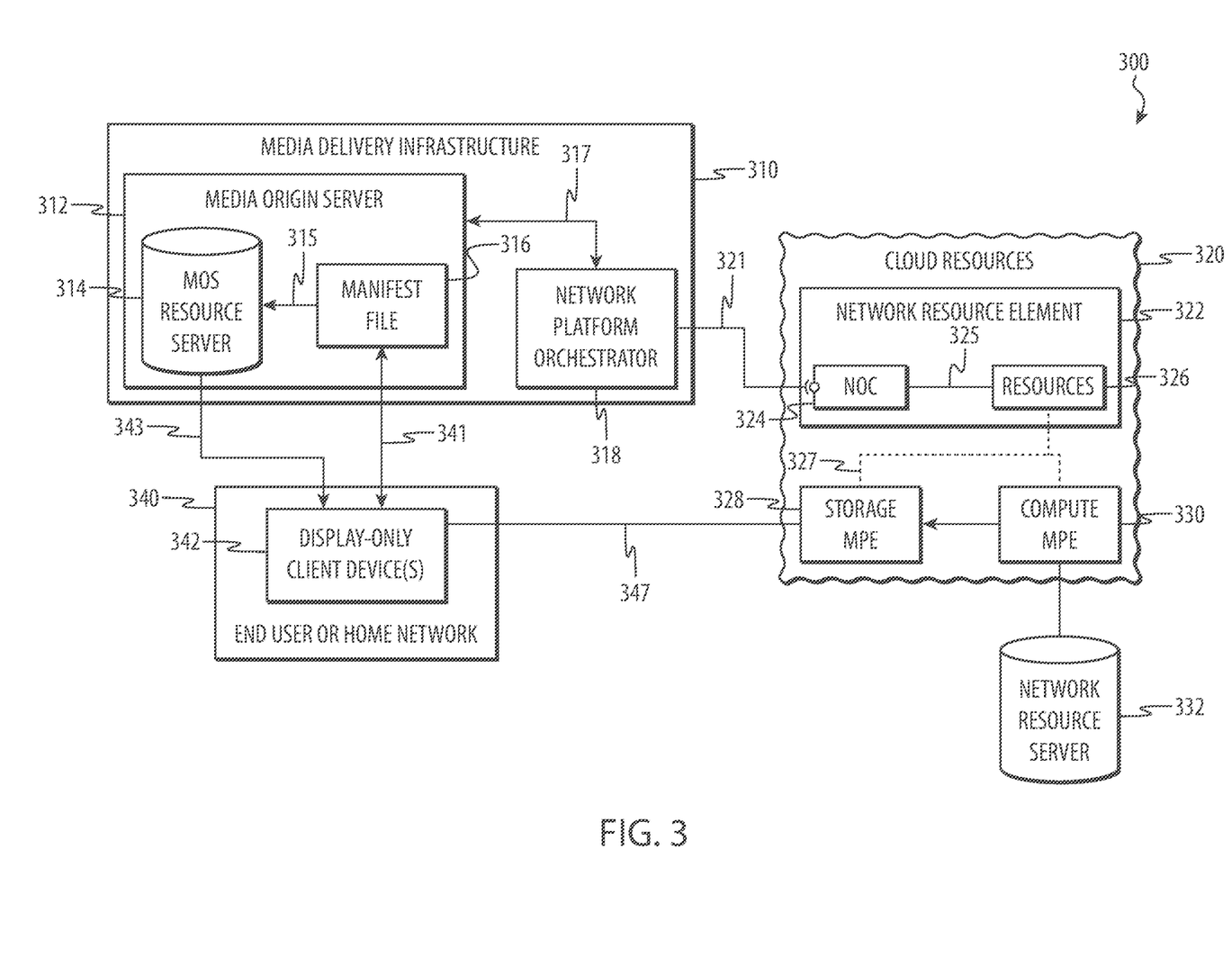
FIG. 3 is a block diagram of a media delivery service in communication with a separate network and a first type of client device, according to embodiments such as described herein.
Figure 4:
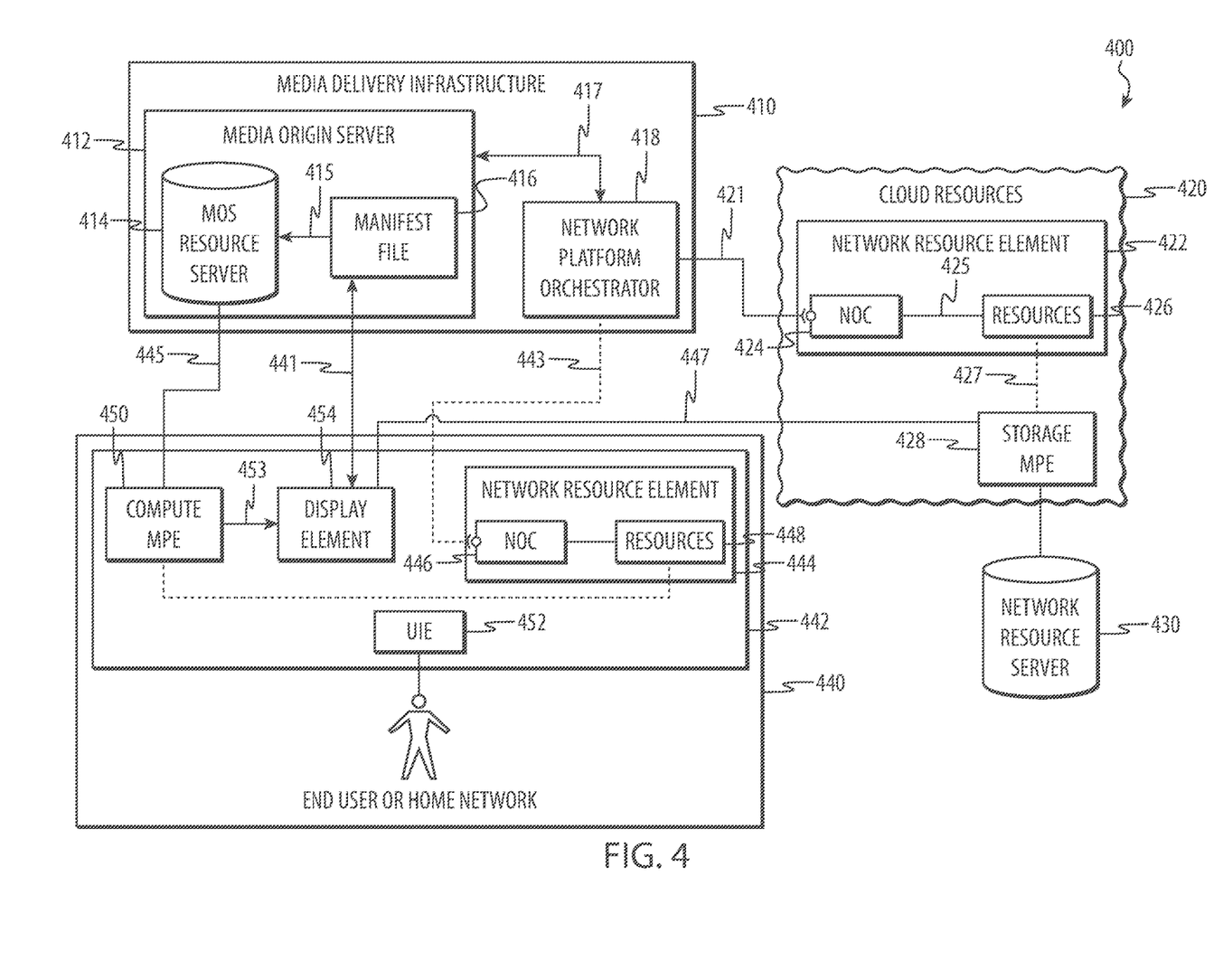
FIG. 4 is a block diagram of a media delivery service in communication with a separate network and a second type of client device, according to embodiments such as described herein.

In the embodiments described in FIGS. 2-4, the media delivery system (MDS) includes at least a media origin server (MOS), a network platform orchestrator (NPO) and a local media resource server, termed a "MOS resource server". In some examples, an MDS may include other components. Generally and broadly, as explained in more detail herein, in these embodiments, the MDS may be capable of accessing or forming a communication link with a network distinct from the media delivery system itself. The MDS is capable of receiving signals, such as a request for media content, from an end-user's client device. The MOS hosts at least some of the resources (e.g., storage or computational resources) that the media delivery system may use to meet a request for media content. The MDS may use an NPO as a communication gateway to the distinct network, among other uses. As described in more detail below, an NPO may be physical or logical device that interacts with the MOS. Next, the MOS resource server may provide storage or computational capabilities, and may be collocated with, or a component of, the MOS, though this is not required.

FIG. 2 is a flow chart of a method 200 by which such media delivery systems can provide media content to a client device. One skilled in the art will recognize variations on the method 200 that lie within the scope of the following descriptions, including inserting additional operations, omitting certain operations, performing the operations in a different order, and so forth.

At operation 210, a client device's request for media content is received at the MOS of the MDS. Generally and broadly, the request for media content may specify information related to the capabilities of the client device and information related to the media content to be returned to it. Specific structures and contents of embodiments of a request for media content will be explained in great detail below. The MDS in response to receiving the request for media content from the client device may then provide, instantiate, or establish a media control plane (MCP).

An MCP may be implemented by an application programming interface, and may be run by the MOS. In some embodiments, the MCP may be implemented as a control plane in or between the application layer and the network layer according to the OSI model of a communication system, though this is not required. In the OSI model, a control plane generally refers to functions and processes that determine paths for signals or data to use, such as routing protocols, spanning trees, and others known to one skilled in the art. Regardless of whether the MDS is configured according to the architecture of the OSI model, the MCP may implement a command and control channel to manage the delivery and processing of media, such as by synchronization of the various resources of the MDS. The MCP may use one or more sets of network protocols to provide the command and control channel, for example, using HTTP2+ JSON.

At operation 220, the MDS provides, instantiates, or establishes a network control plane (NCP). In some embodiments, an NPO of the MDS may provide, instantiate, or establish the NCP, though this is not required. Analogous to the MCP, the NCP may be implemented as a control plane in, or between, the application layer and the network layer, according to OSI model of a communication system, though this is not required. The NCP may be operable to provide a communication interface or gateway with one or more networks separate from the MDS. The NCP may implement a command and control channel to manage the transmission of signals between the MDS and the network(s). The NCP may use one or more sets of network protocols to provide the command and control channel, for example, Ethernet, HTTP2+JSON, IP6, or another set of network protocols. The MCP and the NCP may use the same or different network protocols. The MDS may use the NCP to establish a network session (e.g., a continuous communication link) with the one or more networks.

The MDS may make use of the NCP to locate one or more network resource elements on the network(s). As used herein, a network resource element (NRE) will denote any accessible capability that the MDS may connect to, such as computing node, a storage node, a server, or the like. Further details regarding NREs will be described below. At operation 220, the MDS may locate or acquire access to a sufficient number and types of NREs to be able to meet the client device's request for media content. This is termed "provisioning" herein.

At operation 230 of method 200, the MDS provides, instantiates, or establishes a media data plane (MDP). The MDP may be implemented as a data plane in or between the application layer and the network layer, according to OSI model of a communication system, though this is not required. The MDP may be implemented by an API. The MDP may be operable to provide a channel that can be used for distribution of various media resources that the client device may use to generate, or render or present the ultimate media presented to the end-user. As examples, these various media resources may be a complete video sequence to be displayed on an end-user's TV screen, the TV screen having limited processing capabilities, or the various media resources may be compressed data and other information that may be used by a client device with significant processing capacity to generate the ultimate media presented to the user.

Embodiments of specific signal flows that may be used by the method 200 are described in further detail below in regard to FIG. 5.

Method 200 and its variations disclose operations that an MDS may use to implement network-based media processing. Since the method 200 may allow an MDS to provide media of different types and qualities to a variety of client devices, based on differing requests, the methods are said to be "application aware." By means of these embodiments, an MDS may avoid storing all possible forms of media content that a client device may request. It may allow an MDS to adapt to new technologies of client devices as they may emerge. An MDS may acquire and store media in a native format, and/or access or obtain, either internally or by establishing a network session, sufficient resources and capabilities to process the media from its native format and then to provide the result in the client device's requested format. As an example, in the case described above of the virtual museum tour, an MDS may store, or have access to, a very large quantity of data (e.g., 3D and/or stereoscopic image data) initially recorded in one or more formats. Various end-users may have a variety of AR/VR headsets, each requiring inputs or signals in different formats for rendering the current view of the museum. Upon receiving a client device's request for a particular view of the museum, the MDS can process the data in its initial format to provide it to the client device in the client device's format.

In some embodiments, the methods used by an MDS may make use of a set of interchange formats or media translator functions that can convert media between formats, such as to formats used by various immersive client devices, such as VR/AR headsets. In such embodiments, an MDS may be able to avoid storing the media in all formats. A particular interchange format is Immersive Technologies Media Format (ITMF). In ITMF, image data is conveyed with six degrees-of-freedom, and may be based on scene graph, a data structure used in computer animation and computer games.

Certain embodiments of systems, structures, components, and architectures for media delivery systems that may implement network-based media processing are now described in relation to FIGS. 3 and 4. One skilled in the art will recognize variations that lie within the scope of the following descriptions.

Generally and broadly, FIGS. 3 and 4 are respectively block diagrams 300 and 400 illustrating how the MDS's 310 and 410 may interconnect to, communicate with, or transmit/receive data and media content between, respectively, a constrained client device 340 and a separate network 320, and an unconstrained client device 440 and a separate network 420. Generally and broadly, a constrained client device has only limited internal components or capabilities to perform media or other processing or computations as required to output the received media content to the end-user, whereas an unconstrained client device has significant capabilities for computations and processing. The distinction between a constrained and an unconstrained client device is not sharp and may, for example, depend on a context or application being run on the client device. Though the MDS's 310 and 410 are shown with the same internal components, labelled the "media delivery infrastructure," this is not required. In alternative embodiments, depending on the type and capabilities of the client device or other factors, the MDS may have or make use of more or fewer components. For example, operators of an MDS may add or assign extra MOS's depending, e.g., on the number of client devices with which the MDS must interact, and those client devices' capabilities.

More particularly, FIG. 3 is a block diagram 300 illustrating components of an MDS 310 and how it may be connected with a constrained client device 340 and the separate network 320. The MDS 310 may include a MOS 312 having a communication link 317 with an NPO 318. The communication link 317 may be implemented as: interconnect lines on a single circuit board to which the MOS 317 and NPO 318 are both affixed, a backplane connection of a server or processor rack, a physical link such as fiber optic cable, coax cable, twisted pair and the like, a wireless link such as BlueTooth, WiFi, and the like, or another technology. The communication link 317 may be through another physical device, such as a router, server, computer, or other device.

The MOS 312 manages a media control plane. Certain operations that MOS 312 may perform include responding to requests for media content from the constrained client device 340. Such requests for media content may be for access (by the constrained client device 340) to specific media resources that can meet the characteristics of the features of the constrained client device 340 (e.g., display resolution, color gamut, camera viewpoint, and/or other characteristics).

The MOS 312 may include a MOS resource server 314 that may provide storage for media data, in one or more formats. The MOS 312 may also contain or provide storage for a manifest file 316. Generally and broadly, but not necessarily, the manifest file 316 may store information regarding the request for media content (such as URIs of media) received from the constrained client device 340. The MOS resource server 314 may contain the manifest file 316, or (as shown) the MOS resource server 314 may have a communication link 315 to the manifest file 315. The communication link 315 may be implemented as described above for the communication link 317. The MOS resource server 314 may provide rapidly accessible storage (e.g., fast RAM or disk) or computational capabilities for the MOS 312.

The MDS 310 may make use of the NPO 318 to form a communication link 321 with a network 320 distinct from the MDS 310. The communication link 321 may be implemented as described above for the communication link 317. The MOS 310 may use the NPO 318 in the network control plane to request network resources that may be used to meet the request for media content from the constrained client device 340.

In some cases, the network 320 may be collocated with, or located near, the MDS 310, and possibly even operated by the same media delivery service or company. For example, a cable internet and/or media provider may operate a large array of servers as the network 320 for storing large amounts of media resources (e.g., video, audio, and so forth), and also operate one or more separate media delivery systems, such as MDS 310, that connect to client devices over the provider's cables. Additionally and/or alternatively, the network 320 may be a network, such as the internet, with which the MDS 310 may form the communication link 321. The network 320 may be a web hosting service, a cloud computing or storage service operated by a separate company, or the like.

In the block diagram 300, the constrained client device 340 is a constrained client device, which may have only limited on-board capabilities to provide media processing. As a first example, the constrained client device 340 may be a set top box (STB) of a cable internet and/or media service. The STB may be configured just to display video on a display-only device 342, such as a TV screen. The STB may not have, e.g., the graphics capability to render a 3D image from graphics primitives. In a second example, the constrained client device 340 may be a wireless router distributing internet content. In a third example, the constrained client device 340 is a VR headset having the capability of displaying only complete images received in a specific format, and without image generation capabilities. Other examples will be apparent to one skilled in the art.

The constrained client device 340 may form communication links 341 and 343 with the MDS 310. The communication links 341 and 343 may in fact be over the same physical or wireless channels, such any those described above, or may be over distinct channels.

To provide an end-user with a desired media output, the constrained client device 340 transmits a request for media content to the MDS 310; the request may be initially processed by the MOS 312. The request for media content may contain information about the constrained client device 340 itself, such as its capabilities, make, model, current operating system, and the like. The request may also contain information regarding the media it is to receive. Further details regarding the request for media content will be described below. The information in the request for media content may be used by the MDS 310 to determine that the constrained client device 340 is a constrained client device.

After or upon reception of the request for media content from the constrained client device 340, the MDS 310 may use the information therein to determine media resources to be used to provide the constrained client device 340 with the requested media content. Such media resources include, but are not limited to, storage or memory locations storing data or media, such as source media in native or other formats, and computational resources (whether physical or virtual) used to acquire, process, and combine the source media into the format of the media content specified in the request for media content. As an example, in the case of the VR museum tour introduced above, the MDS 310 may find the storage locations of the images for the particular gallery specified in the request for media content, and determine the amount graphics processing may use to generate image(s) corresponding to the end-user's viewpoint.

The MDS 310 may determine that such media resources are locally available, such as available at MOS 312. Additionally and/or alternatively, the MDS 310 may use or open the communication link 321 to the network 320, such as by use of the NPO 318. The MDS 310 may locate or obtain access to a network resource element 322 on the network 320. A network resource element 322, generally and broadly, may include one or more physical or logical devices, computational nodes (such as may use microprocessors, GPUs, or the like), or storage devices, located on the network 320. A network resource element 322 may additionally and/or alternatively include a server, or an instantiated virtual processing element or storage node at a web service. Each such device, whether virtual or physical, is shown as the resource 326 in the block diagram 300. The network resource element 322 may have one or more resources 326.

The network resource element 322 may include a network orchestration client (NOC) 324 to perform communication operations with the NPO 318 over the communication link 321. The NOC 324 may be a physical device, such as a network card or other transceiver device, or implemented as a program running on a computational resource of the network resource element 322. The NOC 324 is communicatively linked with the resource 326 over the communication link 325.

The resource 326 may either include, or be communicatively linked with, one or more compute Media Processing Elements (or "Entities") 330 (compute MPE), or one or more storage MPEs 328 of the network 320. The communication link 327 between the resource 326 and the compute MPE 330 and the storage MPE 328 may be any of the previously described communication links. The compute MPE 330 may be one or more physical or logical computational devices configured to apply processing to data (e.g., microprocessor(s), graphics processing units (GPUs), FPGA(s), and the like, performing signal and image processing, generation or compression, media format conversion, or the like), or may be implemented in software running on any computer or processing element. The storage MPE 328 may be part of, or separate from, the compute MPE 330, and may store initial, intermediate, or final results of the processing provided by the compute MPE 330. The compute MPE 330 may be linked with, or have access to, information or data stored on the Network Resource Server 332.

Once the MDS 310 has selected or provisioned one or more network resource elements 322 (based on their determined capabilities to access and process stored media to satisfy the request for media content), the constrained client device 340 may use the Media Data Plane to access and use the provisioned media resources. Such access may be performed using either a push or a pull architecture or protocol, as explained further below. In some embodiments, the media content, whether generated at MDS 310 itself or in conjunction with media resources on the network 320, is then stored at the MOS resource server 314 and streamed to the constrained client device 340 over communication link 343. Additionally and/or alternatively, media content may be streamed directly from the storage MPE 328 to the display 342 of the constrained client device 340 over the communication link 347.

FIG. 4 is a block diagram 400 illustrating components of an MDS 410 and how it may be connected with an unconstrained client device 440 and the separate network 420. Generally and broadly, the MDS 410 and its components may be as described for the MDS 310, but may include more or fewer components. To avoid repetition their descriptions will not be given, but one skilled in the art will recognize how differences, if any, between the MDS 310 and the MDS 410 may be implemented.

The MDS 410 may be configured to form a communication link 421 with the network 420. Broadly speaking, the network 420 and its components may be as described for the network 320, but may include more or fewer components, such as network resource elements. In the particular embodiment shown in block diagram 400, the network 420 is shown with fewer components, as some of the media resources previously shown and described in the network 320 may be obtainable or accessible on the unconstrained client device 440 itself. However, this need not be the case in other embodiments.

In the situation illustrated in the block diagram 400, the unconstrained client device 440 now is an unconstrained client device. The unconstrained client device 440 may have one or more media resources that may be used to obtain, access, or produce requested media content. This may allow the MDS 410 to treat, use, access, or interact with the media resources of the unconstrained client device 440 as though such media resources were in the network 420.

An example of the unconstrained client device 440 may be a multi-user game console. Such a console may be able to request source data regarding an environment, such as geometric and visual primitives, in which multiple players are interacting. The console itself may be equipped with processing capabilities to render multiple viewpoints from the source data, and transmit the viewpoints to respective headsets of the various players.

The network 420 may be implemented as described for the network 320, and may have communication link 421 with the MDS 410. The components of the network 420 (network resource element 422, NOC 424, resources 426, communication links 425 and 427, and storage MPE 428) may be as described for the respective components of the network 320, and those descriptions will not be repeated. However, one skilled in the art will recognize how differences, if any, between the network 320 and the network 420 may be implemented. For example, the network 420 may include, as in network 320, a compute MPE, such as compute MPE 328, that is linked with the storage MPE 330.

The unconstrained client device 440 may include at least one component operable as a networked client 442. The networked client 442 may include storage and computational capabilities. In the embodiment shown in block diagram 400, the networked client 442 may include: a network resource element 444 that in turn includes NOC 446 communicatively linked with resources 448; a compute MPE 450 connected by communication link 453 to display element 454; and a user interactive element (UIE) 452. These components, except for UIE 452, may be as described for the corresponding components described in the configuration shown in the block diagram 300, and repetition of their descriptions will not be given. The UIE 452 may, for example, obtain information or data about an end-user's motions or actions. These motions or actions may be included in an updated request for media content. In the example of the VR museum tour, if an end-user's head turns, corresponding data may then be used by the MDS 410 to update the view displayed. A new request for media content may then be initiated. In this situation, the MDS 410 may have already provisioned the network resource element 444 as operable to compute and render the updated view displayed.

The MDS 410 may operate similarly to how MDS 310 operates to provision media resources to be used to meet requests for media content from the unconstrained client device 440. In the situation shown in FIG. 4, however, some of those media resources may be available on the unconstrainted client device 440 itself. Once the media resources have been provisioned and the media content generated, the media content may be streamed to the unconstrained client device 440 from the MDS 410 over the communication links 441, 443, and 445, and from the storage MPE 428 over the communication link 447.

Figure 5:
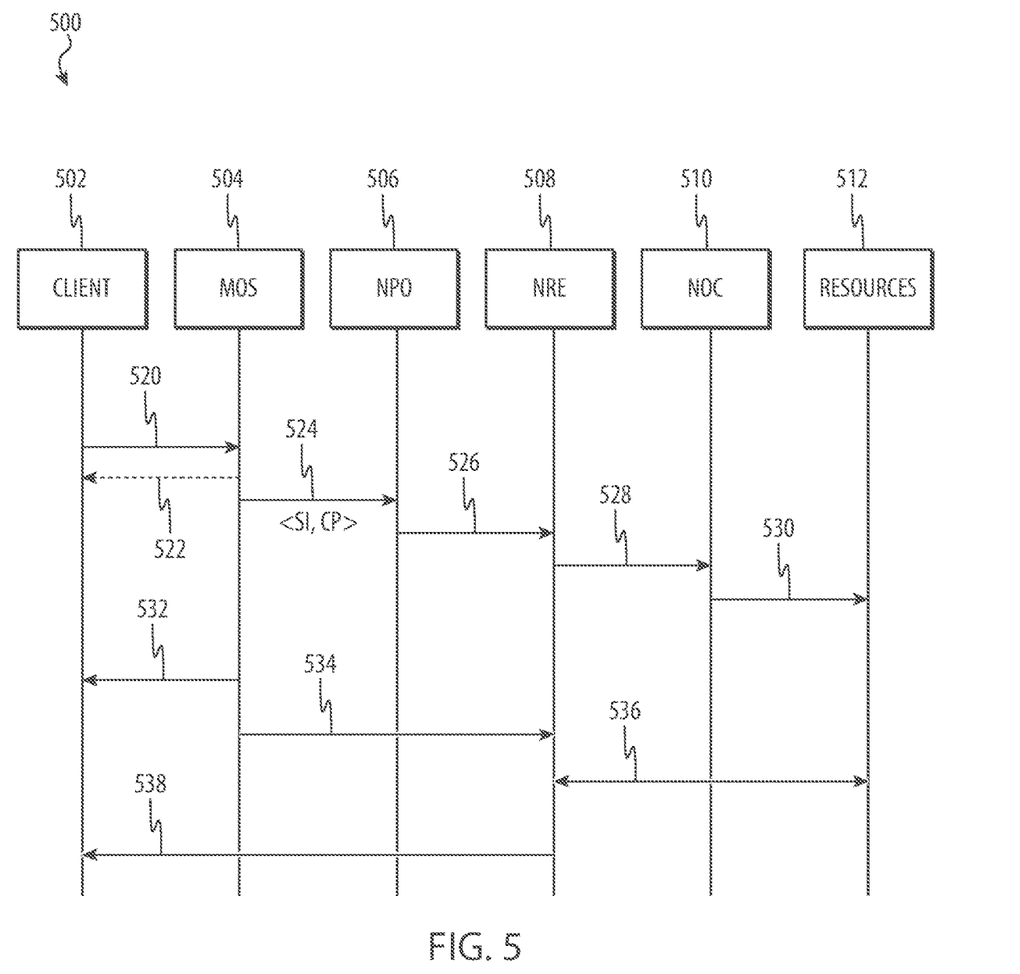
FIG. 5 depicts a signal flow diagram corresponding to method of operating a media delivery system, according to embodiments such as described herein.

FIG. 5 shows a signal flow diagram 500 of a method that a media delivery system may use as part of providing requested media content from a client device. The signal flow diagram 500 may be used in the configurations shown in the block diagrams 300 and 400. More particularly, the sequence of messages shown in the signal flow diagram 500 is between a client device 502 (whether constrained or unconstrained), a MOS 504 of a media delivery system (such as either MDS 310 or MDS 410), a NPO (such as NPO 318), a NRE (such as NRE 508), a NOC (such as NOC 324), and resources 512 (such as resources 326).

The transmission 520 is a request for media content sent from the client device 502 to the MOS 504 of an MDS. In some embodiments, the request for media content may contain information some or all of the following information components: (a) a client ID, (b) a priority type, (c) a client device type (and possibly a list of client subtypes, such as display type, audio type, haptic type, actuator type, and so forth), (d) URIs for the media content requested by the client device, (e) performance indicators for the available media resources at the client ID (such as may be used to determine whether the client device is constrained or unconstrained), such as storage resources, number of CPU/GPU cores, speeds thereof, and possibly other related parameters, (f) performance indicators for the application being run on the client device (e.g., aggregated required upstream and downstream bandwidths, and possibly other related parameters), (g) Service Level Agreement, (h) client device resource buffer(s) coordinates (in the case of push architectures), (i) Quality of Service indicators, and possibly other components. A request for media content may not contain all the listed components. In the cases of interactive applications, such as games, the client device may transmit to the MOS an array or list of request tokens, where each token represents a predicted request, (e.g., a request for media that the client device predicts may be needed based on the user's orientation, such as in 6 degrees of freedom).

In transmission 522, the MOS 504 may return to the client device 502 certain corresponding information components, such as: (a) an ordered list of URIs (e.g., network resource elements, or client device resource buffers), and (b) security and/or authentication key(s). Other information may also be included in the transmission 522.

The transmission 524 is initiated by the MOS 504 by use of a network control plane. The network control plane may use a Management and Network Orchestration (MANO) protocol to establish a network session (e.g., an open communication channel or link) with a network (such as network 320). The transmission 524 may include: (a) server information (SI), (b) a client device profile (CP) with information about the client device, such as performance indicators, (c) performance indicators for converting native or mezzanine format data to or from ITMF, and possibly other information.

Transmissions 526 and 528 contain information by which the NPO 506 instructs the NOC 510 to orchestrate or instantiate a connection. The transmissions may be mediated by the NRE 506.

Transmission 530 from NOC 510 to the resources 512 contains information to make the resources 512 available to the client device.

The transmissions 532, 534, 536 and 538 make use of the media data plane. The client device 502 may access the requested media resources, such as resources 512, by either a pull or a push architecture via the information (e.g., URIs, and so forth) provided to the client device 502 in the transmission 522. For a push architecture, in transmission 532 the NRE 508 may write into the client device resource buffers provided in transmission 520.

In transmission 534, the MOS 504 provides to the NRE 508 mezzanine resources (for example, image data in a native or originally captured format) to be converted to a format for the display of the client device 502, as specified in the request for media content.

Transmissions 536 between the NRE 508 and the resources 512 return URIs for resources adapted for the display format of the client device 502.

Transmission 538 is used in a pull architecture. In transmission 538, the client device 502 issues calls to NRE 508 at the URIs provided in the transmission 522.

Figure 6:
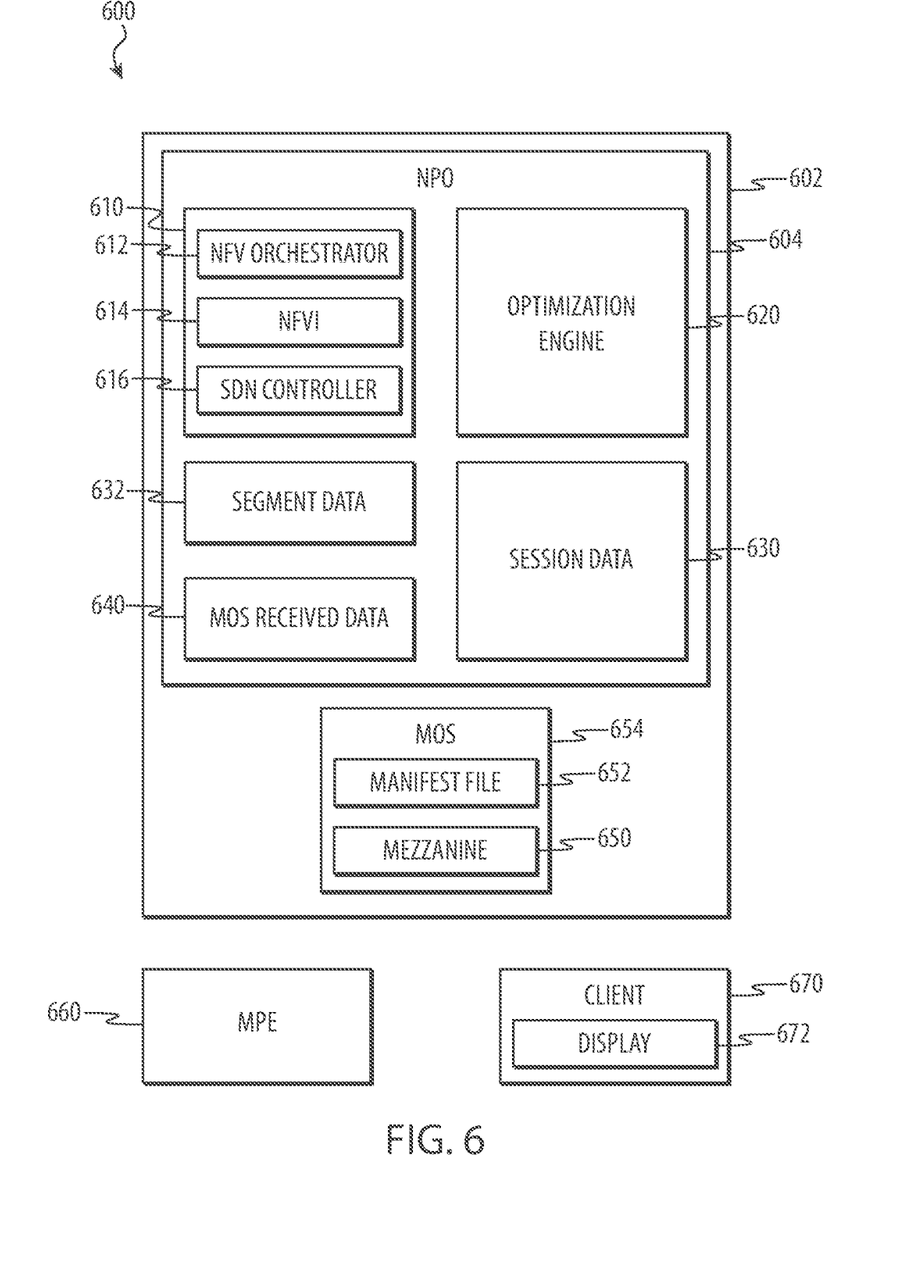
FIG. 6 is a block diagram of components and subcomponents of a media delivery system, according to embodiments such as described herein.

FIG. 6 is a block diagram 600 of a media delivery system (MDS) 602 and certain of its components, according to an embodiment, and also an MPE 660 and a client 670. The client device 670 may be either constrained or unconstrained. The MPE 660 may be located on a network accessible to the MDS 602 by use of the network platform orchestrator (NPO) 604. The MDS 602 may be an extension or variation of the MDS 310 and the MDS 410 described above. The MDS 602 may have other components, such as components or subsystems as shown for the MDS 310 and the MDS 410, but which are not shown in FIG. 6 for simplicity of presentation and discussion. Similarly, the connections between the MDS 602, the MPE 660, and the client device 670 and their respective components are not shown, as the connections are discussed above in relation to the block diagrams 300 and 400. The MPE 660 and the client device 670 and its display 672 are described in further detail herein. The MDS 602 may contain more or fewer components than those shown in the block diagram 600.

The MDS 602 includes a MOS 650 and an NPO 604. The MOS 650 may also contain a local MOS resource server, such as MOS resource server 315, which may be as discussed above. The MOS 650 may include a manifest file 654. The manifest file 654 may be used by the MOS 650 to store information regarding the client device 670 contained in a request for media content received from the client device 670. Such information may be as described as for the manifest file 316 of FIG. 3 and the transmission 520 of FIG. 5. The information regarding the client device 670 contained in a request for media content may contain more or fewer data elements than those listed for the transmission 520.

The MOS 650 shown also contains a mezzanine 652. The mezzanine 652 may include one or more servers that store data for generating the requested media content, but such data may be in a native media format (or, "mezzanine media format"). In some embodiments, the native media format is the format in which the data was originally produced and supplied to the MDS 602. For example, a sporting event may be recorded and provided to the MDS 602 in an MPEG2 video format. This is the format in which the data is stored in the mezzanine 652. Additionally and/or alternatively, the original media data received by the MDS 652 may be initially processed (such as by a compression algorithm, whether lossy or lossless) and then stored in the mezzanine. As client devices may request media content in any of multiple formats, the MDS 602 may make use of media translator functions to convert from a single format of the native media stored in the mezzanine to the client devices' various requested formats. This may allow the MDS 602 to avoid storing the native media content in multiple formats.

The NPO 604 may operate at least as described above for the NPO 318, as well perform operations related to the components shown in FIG. 6. The NPO 604 may maintain separate memory or storage locations for each of the MOS received data 640, the session data 630, and the segment data 632. The NPO 604 may contain an application aware network controller (AANC) 610. The AANC 610 performs operations that assist the MDS 602 in providing network-based media processing. The AANC 610 may contain a software defined network controller (SDN) 616 that implements a software-defined networking architecture with the separate networks that the MDS 602 may have reason to access; for example, to obtain media resources to meet different requests for media content from client devices as those requests arise. As the separate networks to be accessed may change for different requests, the dynamic network access provided the SDN 616 may allow the NPO 604 to dynamically access different network resource elements. This may enable the media delivery system 602 to implement the network-based media processing described in the embodiments described herein.

The SDN 616 may include a network function virtualization (NFV) orchestrator 612 that may provide control and coordination of the operations of the hardware and software operated by the network function virtualization infrastructure (NFVI).

The NPO 604 may operate an Optimization Engine 620, which may be implemented in software as a set of functions which, in one embodiment, can select the networks and associated media resources thereon that can be used to better meet a request for media content from the client device 670. Criteria for such optimizing selections may include (but are not limited to): latency requirements, power requirements, bandwidth requirements, route cost, and aggregate demand across user base. Other criteria may also be used by the Optimization Engine 620. The output of the Optimization Engine 620 may be provided to the SDN/NFV for access to selected networks and media resources.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

One may appreciate that although many embodiments are disclosed above, that the operations and steps presented with respect to methods and techniques described herein are meant as and accordingly are not exhaustive. One may further appreciate that alternate step order or fewer or additional operations may be required or desired for particular embodiments.

Although the disclosure above is described in terms of various embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources—only on informed consent of the subject of that data and/or information—should be accessed and aggregated only for legitimate, agreed-upon, and reasonable uses.

What is claimed is:

1. A media delivery system, comprising:
   a media origin server configured to instantiate each of a media control plane and a media data plane in response to receiving a request for media content from a client device, the media control plane implementing a first channel for command and control to manage delivery and processing of media at least partially by synchronizing resources of the media delivery system, and the media data plane providing a third channel for distribution of media resources to the client device; and
   a network platform orchestrator communicatively linked with the media origin server, the network platform orchestrator being configured to interact with the media control plane to instantiate a network control plane implementing a second channel for command and control to manage transmission of signals between the media delivery system and a plurality of networks separate from the media delivery system, wherein each of the plurality of networks includes different network resource elements to enable the media delivery system to service requests in accordance with different characteristics of different client devices, the network control plane enabling the media delivery system to locate and access one or more network resource elements of a first network of the plurality of networks to enable servicing of the request for media content by the media delivery system, the first network being external to a media transfer path between the media origin server and the client device, where the one or more network resource elements are configured for converting a format of the media content from a native format to a format specified in the request for media content, to enable the media origin server to meet the request for media content from the client device in accordance with characteristics of the client device,
   wherein each of the media control plane, network control plane, and media data plane are separate planes and each of the media control plane, network control plane, and media data plane are distinct from each of the first, second, and third channels.

2. The media delivery system of claim 1, wherein:
   the media origin server is operable to access a mezzanine file storing a media format package; and
   the media format package includes at least one media translator function operable to translate a first format of a media resource to the format specified in the request for media content.

3. The media delivery system of claim 2, wherein the media format package includes at least one performance indicator.

4. The media delivery system of claim 1, wherein the media control plane and the network control plane are utilized by respective application programming interface programs.

5. The media delivery system of claim 1, wherein:
   the network platform orchestrator is operable to establish a network session with the first network.

6. The media delivery system of claim 5, wherein:
   the network platform orchestrator is operable to establish the network session using the network control plane; and
   the network control plane operates using a management and network orchestration protocol.

7. The media delivery system of claim 6, wherein the media data plane is configured to allow the client device to access the one or more network resource elements.

8. The media delivery system of claim 5, wherein the one or more network resource elements include at least one of a compute media processing element and a storage media processing element.

9. A method of operating a media delivery system, the method comprising:
   receiving, at a media origin server, a request for media content from a client device, the request for the media content including performance indicators of the client device;
   instantiating, at the media origin server, each of a media control plane and a media data plane in response to receiving the request for media content from the client device, the media control plane implementing a first channel for command and control to manage delivery and processing of media at least partially by synchronizing resources of the media delivery system, and the media data plane providing a third channel for distribution of media resources to the client device;
   instantiating a network control plane implementing a second channel for command and control to manage transmission of signals between the media delivery system and a plurality of networks separate from to the media delivery system wherein each of the plurality of networks includes different network resource elements to enable the media delivery system to service requests in accordance with different characteristics of different client devices;

utilizing the network control plane and a network platform orchestrator to (a) locate and access one or more network resource elements of a first network of the plurality of networks separate from the media delivery system to enable servicing of the request for media content by the media delivery system, the first network being external to a media transfer path between the media origin server and the client device, where the one or more network resource elements are configured for converting a format of a media resource from a native format to a format specified in the request for media content, to enable the media origin server to meet the request for media content from the client device in accordance with characteristics of the client device, and (b) obtain the media resource from the one or more network resource elements;

utilizing the media data plane to adapt the media resource in accordance with the performance indicators included within the request for the media content; and providing the adapted media resource to the client device, wherein each of the media control plane, network control plane, and media data plane are separate planes and each of the media control plane, network control plane, and media data plane are distinct from each of the first, second, and third channels.

10. The method of claim 9, wherein the media origin server is configured to access a mezzanine file storing at least one media translator function configured to convert the media resource from a first format to a second format.

11. The method of claim 10, wherein the at least one media translator function is included within a media format package.

12. The method of claim 11, wherein the media format package conveys image data with six degrees of freedom.

13. The method of claim 9, wherein the performance indicators of the client device correspond to a capability of the client device to support at least one of augmented reality displays, virtual reality displays, mixed reality displays, light-field displays, or 360-degree displays.

14. The method of claim 9, wherein utilizing the media data place to adapt the media resource comprises converting the media resource from a first format to the media content in a second format, the second format identified in response to the performance indicators.

15. A method of operating a media delivery system, the method comprising:

receiving, at a medium origin server, a request for media content from a client device;

in response to receiving the request for the media content, instantiating each of a media control plane and a media data plane, the media control plane implementing a first chancel for command and control to manage delivery and processing of media at least partially by synchronizing resources of the media delivery system, and the media data plane providing a third channel for distribution of media resources to the client device;

using the media control plane and a network platform orchestrator, instantiating a network control plane implementing a second channel for command and control to manage transmission of signals between the media delivery system and a plurality of networks separate from the media delivery system, wherein each of the plurality of networks includes different network resource elements to enable the media delivery system to service requests in accordance with different characteristics of different client devices;

using the network control plane and the network platform orchestrator to (a) locate and access one or more network resource elements of a first network of the plurality of networks separate from the media delivery system to enable servicing of the request for media content by the media delivery system, the first network being external to a media transfer path between the media origin server and the client device, where the one or more network resource elements are configured for converting a format of a media resource from a native format to a format specified in the request for media content, to enable the media origin server to meet the request for media content from the client device in accordance with characteristics of the client device, and (b) utilize the first network to obtain the media resource;

adapting the media resource; and providing the adapted media resource to the client device.

16. The method of claim 15, wherein the request for the media content includes performance indicators of the client device, the performance indicators indicating a capability of the client device to display immersive content.

17. The method of claim 16, wherein the immersive content corresponds to content with at least six degrees of freedom.

18. The method of claim 15, wherein adapting the media resource comprises converting the media resource from a first format to a second format.

19. The method of claim 18, wherein the second format is determined based on performance indicators received from the client device.

* * * * *